US011290408B2

(12) United States Patent
Vasamsetti et al.

(10) Patent No.: US 11,290,408 B2
(45) Date of Patent: Mar. 29, 2022

(54) RENDERING CUSTOM EMOJIS IN CROSS-ORGANIZATION COMMUNICATIONS

(71) Applicant: Slack Technologies, Inc., San Francisco, CA (US)

(72) Inventors: Sri Vasamsetti, San Francisco, CA (US); Michael Demmer, San Francisco, CA (US); Steven Gordon, San Francisco, CA (US); Neha Sharma, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 16/948,064

(22) Filed: Aug. 28, 2020

(65) Prior Publication Data

US 2022/0070125 A1 Mar. 3, 2022

(51) Int. Cl.
*G06F 15/16* (2006.01)
*H04L 51/18* (2022.01)
(Continued)

(52) U.S. Cl.
CPC .......... *H04L 51/18* (2013.01); *G06F 3/04817* (2013.01); *G06F 16/955* (2019.01); *H04L 51/36* (2013.01)

(58) Field of Classification Search
CPC ....... H04L 51/18; H04L 51/36; G06F 16/955; G06F 3/04817
(Continued)

(56) References Cited

U.S. PATENT DOCUMENTS 9,699,299 B1 * 7/2017 Pereira .................. H04W 4/12
10,269,164 B1 * 4/2019 Song .................... G06F 3/04883
(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
(Continued)

*Primary Examiner* — Johnny B Aguiar
(74) *Attorney, Agent, or Firm* — Lee & Hayes, P.C.

(57) ABSTRACT

Techniques for enabling a client device associated with an organization to render a custom emoji that is associated with a different organization. In some examples, a first user associated with a first organization can compose a message to a second user associated with a second organization, the message including a custom emoji specific to the first organization. A server computing device can receive the message and determine a resource identifier associated with the custom emoji of the first organization. The resource identifier can provide a location in a database at which the custom emoji is stored. The server computing device formats the message to include the resource identifier and sends the message to the second user. A computing device associated with the second user receives the message and accesses the custom emoji based in part on the resource identifier. The computing device then renders the message with the custom emoji for display to the second user.

20 Claims, 5 Drawing Sheets

(51) Int. Cl.
*G06F 3/04817* (2022.01)
*G06F 16/955* (2019.01)
*H04L 51/56* (2022.01)

(58) Field of Classification Search
USPC .......................................... 709/204, 206, 217
See application file for complete search history.

(56) References Cited

U.S. PATENT DOCUMENTS

| | | | | |
|---|---|---|---|---|
| 2003/0225846 | A1* | 12/2003 | Heikes | G06Q 10/107 709/207 |
| 2005/0156873 | A1* | 7/2005 | Walter | H04L 51/04 345/156 |
| 2010/0063959 | A1* | 3/2010 | Doshi | G06F 16/27 707/618 |
| 2013/0066905 | A1* | 3/2013 | Kocsis | G06F 16/2428 707/769 |
| 2013/0339983 | A1* | 12/2013 | Dai | G06F 3/01 719/318 |
| 2018/0287982 | A1 | 10/2018 | Draeger et al. | |
| 2018/0314409 | A1* | 11/2018 | Adilipour | G06F 16/54 |
| 2020/0081960 | A1* | 3/2020 | Hullette | H04L 51/04 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", Fujitsu Sci. Tech. J., 36, 2, (Dec. 2000) pp. 154-161.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

RENDERING CUSTOM EMOJIS IN CROSS-ORGANIZATION COMMUNICATIONS

TECHNICAL FIELD

Emojis are digital images, icons, or the like that can be used to express ideas, emotions, etc. People often use emojis in electronic communications to describe a situation or express a sentiment. Often times, emojis are used as shorthand expressions to increase speed and brevity in communications. For example, in lieu of typing out a statement of understanding, such as, "okay, I understand," a user may select a "check mark" or "thumbs up" emoji as a visual depiction of understanding. Many communication platforms utilize an encoding standard for rendering previously developed emojis. Such a standard enables cross-organization emoji communications.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
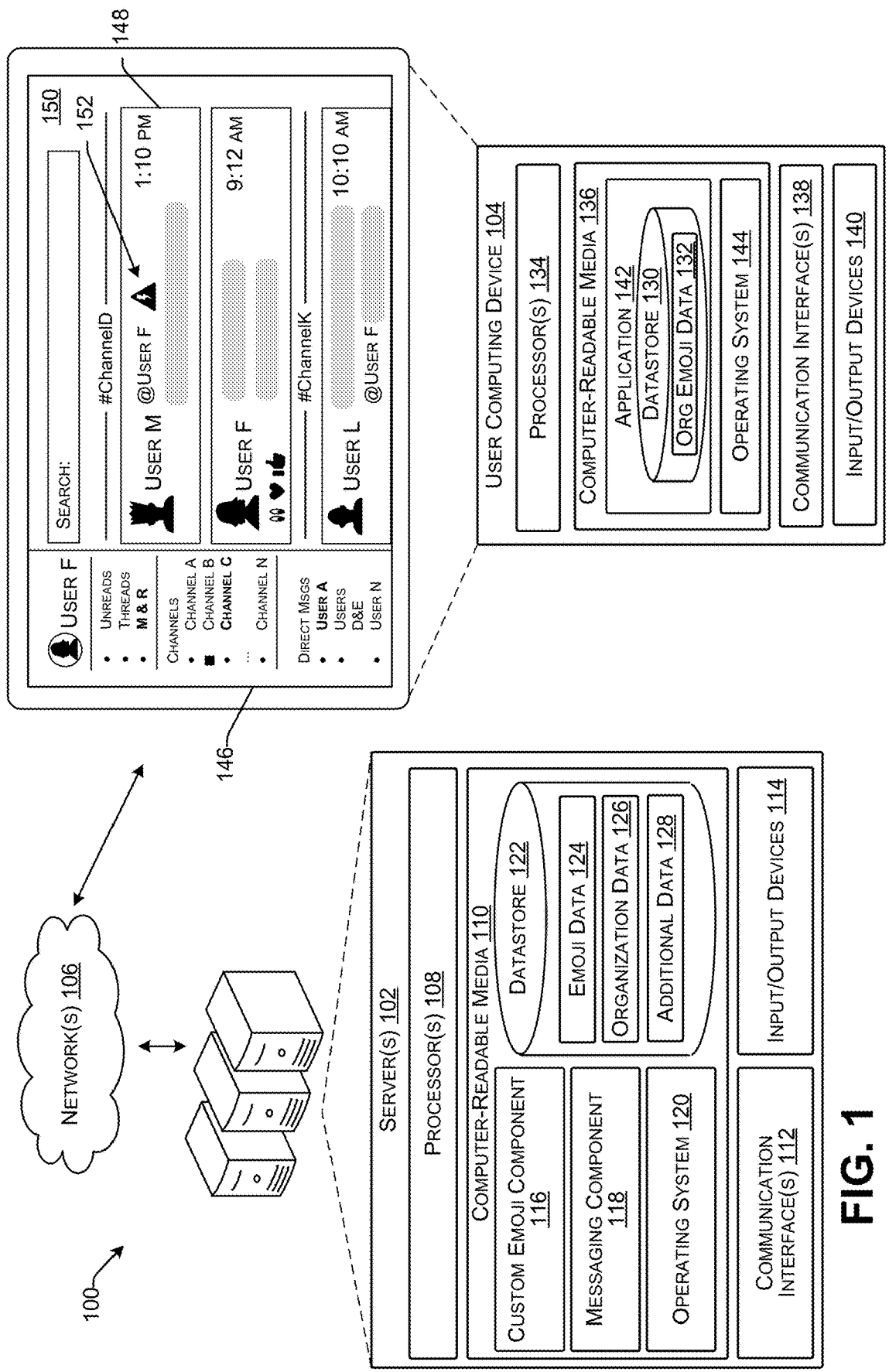
FIG. 1 illustrates an example environment for performing techniques described herein.

Techniques for rendering custom emojis (e.g., digital images, icons, etc.), or other renderable content items, in cross-organization communications via a communication platform are described. The communication platform can be a group-based communication platform, a channel-based messaging platform and/or any other platform for facilitating communication between and among users. In an example, a first user of a first organization can utilize communication services available via the communication platform to communicate with one or more users of a second organization. In some examples, the first user can compose a message including a custom emoji of the first organization. A custom emoji (e.g., custom content item) can include an emoji that is specific to an organization, such as to facilitate communication therein. In some examples, such a custom emoji can be generated by the communication platform based on a request received from a user associated with an organization. For example, the communication platform can receive a request from a user of the first organization to generate a custom emoji including a dancing penguin. The request can include an emoji name, such as dancing_penguin and a visual depiction of the intended emoji. The communication platform can generate the dancing_penguin custom emoji and store the dancing_penguin custom emoji in association with the first organization.

In existing technologies, a communication platform may enable users to develop custom emojis associated with their organization, as described above. These custom emojis may facilitate communication within a particular organization. However, when the first user associated with a first organization sends a message including the custom emoji to a second user associated with a second organization, a second client device of the second user is unable to properly render the custom emoji. In some examples, the second client device determines that the custom emoji is not recognized and consequently renders the emoji name or other text in lieu of the emoji image. In such examples, the meaning and sentiment associated with the custom emoji is lost in the text. For example, in existing techniques, if the second organization in the example above does not recognize the dancing_penguin custom emoji when included in a message, the second client device may not be able to render the dancing_penguin custom emoji.

In some examples, in existing techniques, the second client device can determine that the second organization has associated therewith a custom emoji with a same name as the custom emoji of the first organization included in the message. In such examples, the second client device renders the custom emoji of the second organization in lieu of the intended custom emoji (of the first organization), thereby potentially causing confusion between parties. For example, in existing techniques, if the second organization in the example above also has a custom emoji named dancing_penguin, when dancing_penguin custom emoji is included in a message from the first organization, the second client device may render the second organization's version of the dancing_penguin custom emoji instead of the intended dancing_penguin custom emoji of the first organization. The improper rendering of the custom emoji by the recipient client device can result in a diminished user experience and has the potential to impede cross-organization communications.

Techniques described herein are directed to enabling a client device associated with an organization to render custom emojis of another organization that are included in a message. That is, in at least one example, the client device of the organization can receive a message including a custom emoji associated with another organization, identify the custom emoji included in the message, access the custom emoji, and render the custom emoji on a display of the client device. The message can be a message sent via the communication platform, such as a direct message between two or more users of different organizations or a message associated with an externally shared communication channel (e.g., a communication channel shared between two or more different organizations). The message can include a string of text, emojis, symbols, and the like. In some examples, the message can include an attachment, such as a document or photograph associated with the message.

In various examples, the communication platform can receive the message from a first (originating) client device of a first organization. The communication platform can determine that one or more intended recipients of the message are associated with a second organization that is different from the first organization. The communication platform can also determine that the message includes a custom emoji that is associated with the first organization. Based on the determination that the intended recipient(s) are associated with the second organization and that the message includes the custom emoji, the communication platform can identify a resource identifier associated with the custom emoji. The resource identifier can include an emoji name, an organization identifier, a hash, and/or other data associated with the custom emoji. In at least one example, the resource identifier may include a uniform resource locator (URL) indicating a location in a datastore in which the custom emoji is stored. In other examples, the resource identifier may indicate the datastore in which the custom emoji is stored. In such examples, the custom emoji can be identified within the datastore based on the emoji name, the organization identifier, the hash, and/or the other data associated therewith.

In various examples, the communication platform can format the message to include the resource identifier. The communication platform can then send the formatted message to one or more client devices associated with the one or more intended recipients. For example, the communication platform can send a formatted message including the resource identifier to a second client device associated with a second user of a second organization. The second client device receives the formatted message and determines that the message includes the custom emoji based in part on the resource identifier. In some examples, the second client device can determine whether the custom emoji of the first organization is stored locally in a datastore of the second client device based in part on the resource identifier. Based on a determination that the custom emoji is stored locally, the second client device can utilize stored data associated with the custom emoji to render the message with the custom emoji. Based on a determination that the custom emoji is not stored locally, the second client device can download data associated with the custom emoji based on the resource identifier. In at least one example, the second client device accesses the URL corresponding to the resource identifier to download the data. The second client device can utilize the downloaded data to render the custom emoji with the message. In some examples, the second client device can then store the downloaded data locally in the datastore of the second client device in association with the resource identifier, the organization identifier, the emoji name, hash, or other data associated with the custom emoji. As such, if subsequent messages include the custom emoji, the second client device can render the custom emoji without needing to download it from the communication platform.

From the user experience perspective, techniques described herein greatly enhance effective communication between users of different organizations. The enhanced communication between users of the different organizations results in better collaboration between different organizations while eliminating confusion in pictorial conversations, such as if two different organizations have associated therewith a same emoji name for different emojis. In addition, techniques described herein may reduce a total amount of data transmitted across a network to effectively communicate. In some examples, users may utilize particular emojis to represent actions, such as affirmations, delight, rejections, and the like. The particular emojis may be used in lieu of written expressions capturing a same or similar meaning. Because the written expressions may be replaced with a more effective pictorial tool including less data than many written expressions, the techniques described herein may reduce a total amount of network traffic needed to communicate between users.

While the description above describes rendering custom emojis that are associated with messages sent via a group-based communication platform, techniques described herein can similarly be applicable to other methods of communication, such as electronic mail, short message service messaging, and the like. For example, a user of a first organization can compose an electronic mail message including a custom emoji associated with the first organization and send the electronic mail message to a second user of a second organization. The second user device can receive and render the electronic mail message including the custom emoji. As such, techniques described herein are not limited to group-based communication platforms.

Additionally, while the description describes rendering custom emojis associated with organizations, techniques described herein can similarly be applicable to other groups, such as workspaces that include users from different organizations. For example, a first user of a first workspace can generate a workspace-specific custom emoji associated with the first workspace. The first user of the first workspace can then compose a message including the workspace-specific custom emoji associated with the first workspace and send the message to a second user of a second workspace. A second user device associated with the second user can receive and render the message including the custom emoji. Additional details and examples are described below with reference to FIGS. 1-5.

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (TOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a custom emoji component 116, a messaging component 118, an operating system 120, and a datastore 122.

In various examples, the custom emoji component 116 can be configured to receive a request from a user computing device to generate a custom emoji associated with an organization with which a user of the user computing device is associated. An emoji may include a digital image, animated image (e.g., animoji), moving object, symbol, icon, number, text (e.g., name, acronym, etc.), or any other ideogram that represents an intent, a meaning, an idea, an emotion, or the like. An emoji may include a two-dimensional or a three-dimensional representation. While described in the context of "emojis," techniques described herein can be applicable to any type of renderable content item.

In some examples, a custom emoji can include an emoji generated by a member of a particular organization and/or associated with the particular organization. In some examples, the request can include an emoji name associated with the custom emoji, an image associated with the custom emoji, an organization identifier associated with the user, and/or other data associated with the custom emoji. In some examples, the request can be sent in the form of an "emoji.add" call. Responsive to receiving the request, the custom emoji component 116 can generate a hash associated with the custom emoji. The hash can be a non-guessable code associated with the custom emoji. The hash can include a time stamp associated with the request and/or generation of the custom emoji, the image and/or a textual representation thereof (e.g., the emoji name), and the like. In various examples, the custom emoji component 116 can store the emoji at a particular location in the datastore 122, such as in emoji data 124. In various examples, the custom emoji component 116 the particular location in the datastore 122 can include a location associated with downloadable data. In such examples, the custom emoji can be downloadable from the particular location in the datastore 122. In various examples, the custom emoji component 116 can record the hash in the datastore 122.

In various examples, the custom emoji component 116 can generate a resource identifier associated with the custom emoji. In at least one example, the resource identifier includes the hash, the emoji name, and the organization identifier associated with the custom emoji. The resource identifier can represent a datastore, such as datastore 122 of the server(s) 102, and/or the particular location associated therewith at which the custom emoji is stored. In some examples, the custom emoji can be stored in a datastore remote from the server(s) 102. In at least one example, the resource identifier includes a uniform resource locator (URL) indicating the location in the datastore 122 at which the custom emoji is stored. For example, the resource identifier can include a URL associated with emoji data 124.

In some examples, the custom emoji component 116 can store the custom emoji based on the organization identifier associated therewith. In such examples, custom emojis associated with a particular organization can be stored together in the datastore 122 and/or emoji data 124. In various examples, the custom emoji component 116 can send data associated with the generated custom emoji to user computing devices associated with the organization (e.g., user computing devices associated with the organization identifier). In some examples, the custom emoji component 116 can send an instruction to store the custom emoji in a local datastore 130 on each of the user computing devices associated with the organization, such as in organization emoji data 132.

In at least one example, the messaging component 118 can process messages between users. That is, in at least one example, the messaging component 118 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. The communication channel, or virtual space, can be a data route used for exchanging data between and among systems and devices associated with the communication platform. In at least one example, the messaging component 118 can establish a communication channel between and among various user computing devices, allowing the user computing devices to communicate and share data between and among each other. In at least one example, the messaging component 118 can manage such communications and/or sharing of data. In some examples, data associated with a communication channel can be presented via a user interface. Additional functions of the messaging component 118 are described below.

In various examples, the messaging component 118 can receive a message from a user computing device 104 (e.g., originator of the message) and determine an intended recipient of the message. In some examples, the intended recipient can include one or more users associated with a same or a different organization from the user associated with the user computing device. For example, a first user can be associated with a first organization and can send a direct message to a second user associated with a second organization. For another example, the first user associated with the first organization can send the message via an externally shared communication channel. In such an example, at least one intended recipient of the message can be associated with a second organization.

In various examples, the messaging component 118 can determine that at least one intended recipient of the message is associated with a different organization than the originator. The messaging component 118 can determine whether the message includes a custom emoji associated with the originator's organization. In some examples, the determination that the message includes a custom emoji can be based on an identifier associated with the custom emoji included in the message and/or metadata associated therewith. The identifier can include a name of the custom emoji and an organization identifier associated therewith. In some examples, the identifier can additionally or alternatively include the hash generated by the custom emoji component.

In some examples, based on a determination that at least one intended recipient is associated with the different organization and that the message includes a custom emoji, the messaging component 118 can format the message to cause the recipient user computing device 104 to render the custom emoji associated with the originator's organization.

In various examples, the messaging component 118 can access the resource identifier associated with the custom emoji, such as that stored in the datastore 122 as discussed above. In some examples, the messaging component 118 can include the resource identifier in the message at the location associated with the custom emoji. In some examples, the resource identifier can be included in lieu of the custom emoji identifier and/or custom emoji itself.

In various examples, the messaging component 118 can extract out inline custom emojis from text, attachments, and/or blocks, resolve each of the custom emojis to the associated resource identifiers and include the resource identifier in a custom emoji annotation on the message object. For example, a message from a first user to a second user can include a first custom emoji associated with a first organization of the first user in the text of the message and a second custom emoji associated with the second organization in an attachment. The messaging component 118 can identify the first custom emoji and the second custom emoji associated with the first organization that is different from the recipient's organization, and can determine a first resource identifier associated with the first custom emoji and a second resource identifier associated with the second custom emoji. The messaging component 118 can include the first resource identifier in a first custom_emoji annotation in the message and can include the second resource identifier in a second custom_emoji annotation in the attachment.

In various examples, the messaging component 118 can provide a mapping to the custom emoji associated with the originator's organization, such that the recipient user computing device 104 is able to access the intended custom emoji and download data associated therewith for rendering on a display of the recipient user computing device 104. In various examples, messaging component 118 can send the message including a resource identifier to the one or more intended recipients. In at least one example, the resource identifier can include a particular location in the datastore 122 at which the custom emoji is located. In such an example, the recipient user computing device 104 can access the custom emoji and download a copy thereof for rendering via a user interface.

In various examples, the messaging component 118 can store messages sent between user computing devices in the datastore 122, such as in organization data 126 and/or in additional data 128. In at least one example, the datastore 122 can be configured to store data that is accessible, downloadable, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. Additional or alternative data can be stored in the datastore 122 and/or in one or more other data stores.

In at least one example, the emoji data 124 can store custom emoji data associated with users and/or organizations of the communication platform. In at least one example, the emoji data 124 can include a resource identifier associated with each custom emoji. In some examples, the resource identifier can include an organization identifier, an emoji name associated with the custom emoji, and a hash associated with the custom emoji. In various examples, the custom emojis can be stored in the emoji data 124 based on the resource identifier and/or a portion thereof. In some examples, the custom emojis can be stored in the emoji data 124 based on the organization identifier associated therewith. In some examples, the custom emojis can be stored in the emoji data 124 based on the hash associated therewith.

In at least one example, the organization data 126 can store data associated with organizations associated with the communication platform. In some examples, the organization data 126 can include one or more custom emojis associated with the individual organization. In such examples, responsive to receiving a request to generate a custom emoji from a particular organization, the custom emoji and/or hash associated therewith can be stored in the organization data 126 associated with the particular organization. In some examples, the organization data 126 can include one or more organizational preferences, such as desired level of privacy, security, centralized control, and the like associated with the organization. In some examples, the organizational preference can include a sharing preference with regard to one or more custom emojis associated with the organization. For example, a user associated with an organization can request that a custom emoji be generated in association with the organization. The user can select a privacy setting with regard to the custom emoji, such that the custom emoji is not viewable by users associated with other organizations.

In some examples, the datastore 122 can be partitioned into discrete items of data that can be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, the organization data 126 can include discrete shards for each individual organization, including data related to a particular organization identification. For example, a database shard can store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, individual users can be associated with a database shard within the datastore 122 that stores data related to a particular user account. In some examples, custom emojis generated and/or accessible by an individual user can be stored in association with the individual user. For example, a database shard can store a plurality of custom emojis accessed and viewed by user. In some examples, the user itself can be the owner of the database shard and has control over where and how the related data is stored.

In at least one example, the operating system 120 can manage the processor(s) 108, computer-readable media 110, hardware, software, etc. of the server(s) 102.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web sockets, Application Programming Interfaces (APIs) (e.g., using API calls), HyperText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 134, computer-readable media 136, one or more communication interfaces 138, and input/output devices 140.

In at least one example, each processor of the processor(s) 134 can be a single processing unit or multiple processing units, and can include single or multiple computing units or multiple processing cores. The processor(s) 134 can comprise any of the types of processors described above with reference to the processor(s) 108 and can be the same as or different than the processor(s) 108.

The computer-readable media 136 can comprise any of the types of computer-readable media 136 described above with reference to the computer-readable media 110 and can be the same as or different than the computer-readable media 110. Functional components stored in the computer-readable media can optionally include at least one application 142 and an operating system 144.

In at least one example, the application 142 can be a mobile application, a web application, or a desktop application, which can be provided by the communication platform or which can be an otherwise dedicated application. In some examples, individual user computing devices associated with the environment 100 can have an instance or versioned instance of the application 142, which can be downloaded from an application store, accessible via the Internet, or otherwise executable by the processor(s) 134 to perform operations as described herein. That is, the application 142 can be an access point, enabling the user computing device 104 to interact with the server(s) 102 to access and/or use communication services available via the communication platform. In at least one example, the application 142 can facilitate the exchange of data between and among various other user computing devices, for example via the server(s) 102. In at least one example, the application 142 can present user interfaces, as described herein. In at least one example, a user can interact with the user interfaces via touch input, keyboard input, mouse input, spoken input, or any other type of input. In some examples, user interfaces, as described herein, and/or other operations can be performed via a web browser or other access mechanism.

A non-limiting example of a user interface 146 is shown in FIG. 1. As illustrated in FIG. 1, the user interface 146 can present data associated with one or more communication channels and, in some examples, one or more direct messages. That is, in some examples, the user interface 146 can present messages 148 sent via one or more communication channels and/or via direct message(s) in a single user interface so that the user (e.g., of the user computing device 104) can access and/or interact with data associated with the multiple channels and/or direct messaging instances (e.g., instances of direct messages between a first user and one or more other users) that he or she is associated with and/or otherwise communicate with other users associated with the multiple channels and/or direct messaging instances. The communication channels and/or direct messaging instances can be internal to an organization of the user or externally shared (e.g., include users from two or more organizations).

In various examples, the user interface 146 can present the messages 148 in a messaging region 150, or pane. The messaging region 150 can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, messages 148 (e.g., data) presented in the messaging region 150 can include one or more custom emojis 152. In some examples, the custom emoji 152 can be associated with an organization different from the organization associated with the user computing device 104. That is, in some examples, the messaging region 150 can present custom emojis generated by other organizations.

In various examples, the application 142 can receive a formatted message 148 from the server(s) 102. In some examples, the application 142 can determine that the message 148 includes a custom emoji 152. In some examples, the application 142 determines that the custom emoji 152 is included in the message 148 based on a resource identifier associated therewith being included in the message 148 (e.g., inline data, etc.). As discussed above, the resource identifier can include at least one of an organization identifier of the organization to which the custom emoji 152 is associated, an emoji name, a hash generated by the server, and/or other data.

In various examples, the application 142 can access the datastore 130 to determine whether the custom emoji 152 associated with the resource identifier is stored locally in the user computing device 104. In some examples, the application 142 can access the organization emoji data 132 to determine whether the custom emoji 152 is locally stored. In some examples, the custom emoji 152 can be stored based on an organization identifier associated therewith, the resource identifier, the hash, or the like. In some examples, the custom emoji 152 can be stored based on an emoji name associated therewith. In some examples, the application 142 can determine two or more emojis stored in the datastore include the emoji name. In such examples, the application 142 can identify the intended custom emoji 152 based on the resource identifier or data associated therewith, such as based on the organization identifier, hash, or the like. The application 142 can then cause the user interface 146 to present the intended custom emoji via the messaging region 150.

In various examples, based on a determination that the custom emoji 152 is not stored locally on the user computing device 104, the application 142 can access the custom emoji 152 from the datastore 122 of the server(s) 102, such as based on the resource identifier. As stated above, in at least one example, the resource identifier includes a URL indicating a location at which the custom emoji 152 is stored in the datastore 122 or another database remote from the user computing device 104. In such examples, the application 142 can access the URL to retrieve the custom emoji 152. In some examples, the application 142 can download the custom emoji 152 from the datastore 122 and/or other database based on the resource identifier.

In the illustrative example, the application 142 can cause the user interface 146 to present the custom emoji 152 in the corresponding message 148. As discussed above, the resource identifier can be included in the formatted message at a location in the message at which the user intends the custom emoji 152 to be visible. The application 142 can thus cause the user interface 146 to present the custom emoji 152 at the intended location within the message. While primarily discussed herein as the custom emoji 152 being included in the message (e.g., inline), this is not intended to be limiting, and the custom emoji 152 can be presented in an attachment or at another location associated with the message 148.

In some examples, the application 142 can store the custom emoji 152 and/or metadata associated therewith (e.g., hash, organization identifier, emoji name, resource identifier, etc.) in the local datastore 130, such as in the organization emoji data 132. In such examples, the application 142 can easily access the locally stored custom emoji 152 for use in a subsequent message. In various examples, the application 142 can use the custom emoji 152 stored in the local datastore 130 to quickly render the custom emoji 152 when included in subsequent messages, such as without having to download the data from a remote database based on the resource identifier.

In some examples, the application 142 can make the custom emoji 152 available for use by a user of the user computing device 104. In such examples, the user can be able to include the custom emoji 152 associated with a different organization in a message drafted by the user. In some examples, the application 142 can make the custom emoji 152 accessible in communication channels and/or messages 148 associated with other users that are associated with the organization from which the custom emoji 152 originated. In some examples, the application 142 can make the custom emoji 152 accessible to the user when drafting messages to any other user of the communication platform. In such examples, the application 142 can provide unrestricted use of the custom emoji 152 within the communication platform.

In at least one example, the operating system 144 can manage the processor(s) 134, computer-readable media 136, hardware, software, etc. of the server(s) 102.

The communication interface(s) 138 can include one or more interfaces and hardware components for enabling communication with various other devices (e.g., the user computing device 104), such as over the network(s) 106 or directly. In some examples, the communication interface(s) 138 can facilitate communication via Websockets, APIs (e.g., using API calls), HTTPs, etc.

The user computing device 104 can further be equipped with various input/output devices 140 (e.g., I/O devices). Such I/O devices 140 can include a display, various user interface controls (e.g., buttons, joystick, keyboard, mouse, touch screen, etc.), audio speakers, connection ports and so forth.

While techniques described herein are described as being performed by the custom emoji component 116, the messaging component 118, and the application 142, techniques described herein can be performed by any other component, or combination of components, which can be associated with the server(s) 102, the user computing device 104, or a combination thereof.

FIGS. 2-5 are flowcharts showing example processes involving techniques as described herein. The processes illustrated in FIGS. 2-5 are described with reference to components described above with reference to the environment 100 shown in FIG. 1 for convenience and ease of understanding. However, the processes illustrated in FIGS. 2-5 are not limited to being performed using the components described above with reference to the environment 100. Moreover, the components described above with reference to the environment 100 are not limited to performing the processes illustrated in FIGS. 2-5.

The processes in FIGS. 2-5 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 2-5 can be combined in whole or in part with each other or with other processes.

As noted above, the processes illustrated in FIGS. 2-5 are described with reference to components described above with reference to the environment 100 shown in FIG. 1 for convenience and ease of understanding. FIG. 1, however, illustrates a single user computing device 104. In practice, the environment 100 can have multiple (e.g., tens of, hundreds of, thousands of, millions of, etc.) user computing devices that are each similarly configured to the user computing device 104. FIGS. 2-5 describe interactions between two or more user computing devices, each which can be configured similarly to the user computing device 104, and/or the server(s) 102.

Figure 2:
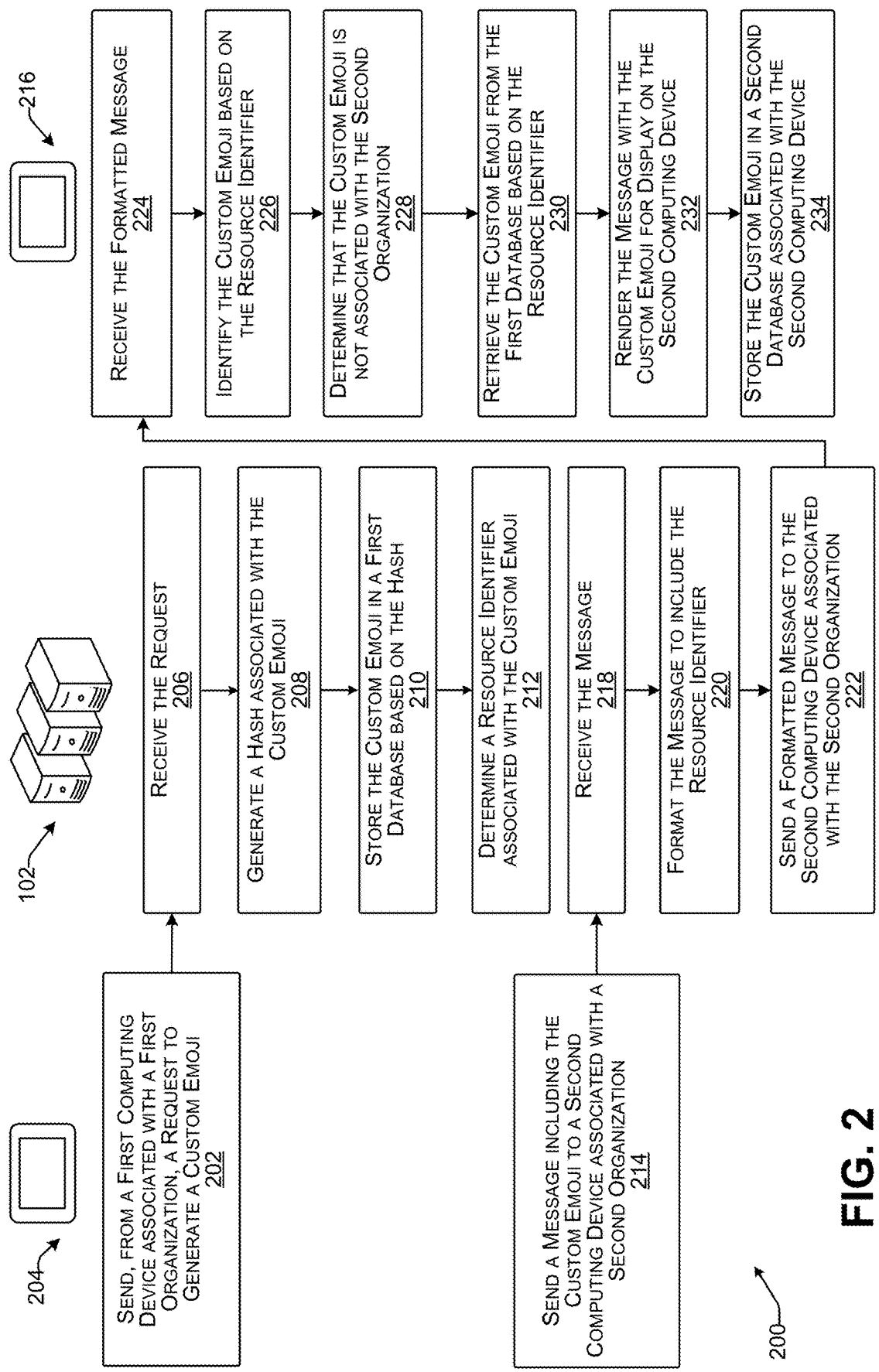
FIG. 2 illustrates an example process for generating a custom emoji and causing the custom emoji to be rendered on a client device, as described herein.

FIG. 2 illustrates an example process 200 for generating a custom emoji and causing the custom emoji to be rendered on a client device, as described herein.

At operation 202, a first instance of an application 142 can send, from a first computing device 204 (such as user computing device 104) of a first organization, a request to generate a custom emoji. In at least one example, a user associated with the first organization can interact with a user interface, such as user interface 146 presented via the first computing device 204, to request a generation of the custom emoji. The request can include a visual depiction of the custom emoji, an emoji name associated therewith, an organization identifier associated with the first organization, or the like. In some examples, the request can be submitted and/or generated utilizing an "emoji.add" call.

At operation 206, a custom emoji component 116 of the server(s) 102 can receive, from the first computing device 204, the request to generate the custom emoji. In various examples, the custom emoji component 116 can determine that the first organization permits the generation of custom emojis and/or that the first computing device 204 associated with the first organization is permitted to generate custom emojis.

At operation 208, the custom emoji component 116 can generate a hash associated with the custom emoji. The hash can include a timestamp associated with the request, an image associated with the emoji, a textual description of the image, an emoji name, an organization identifier, a user identifier associated with the generating user, and/or other data associated with the custom emoji. In some examples, the hash can include a non-guessable string of data that is unique to the custom emoji. In such examples, the custom emoji can be identified by the hash.

At operation 210, the custom emoji component 116 can store the custom emoji in a first database, such as datastore 122 and/or emoji data 124. In some examples, the custom emoji component 116 can store the custom emoji based on the hash, the emoji name, the organization identifier, or the like. In at least one example, the custom emoji component 116 stores the custom emoji in association with the organization identifier. In such an example, the custom emojis associated with a particular organization can be stored together in the datastore 122.

At operation 212, the custom emoji component 116 can determine a resource identifier associated with the custom emoji. In some examples, the custom emoji component 116 generates the resource identifier based at least in part on the organization identifier, the emoji name, and the hash associated with the custom emoji. In various examples, the resource identifier can include a unique identifier associated with the custom emoji such that the custom emoji can be identified based on the associated resource identifier. In at least one example, the resource identifier can include a uniform resource locator (URL) indicating a location in the datastore 122 at which the custom emoji is stored.

At operation 214, the first computing device 204 sends a message including the custom emoji to a second computing device 216 associated with a second organization. In some examples, the message can be sent via a shared communication channel between one or more users of the first organization and one or more users of the second organization. In some examples, the message can include a direct message between the first user associated with the first organization and one or more other users associated with the second organization. In various examples, the message can indicate the one or more intended recipients of the message. In some examples, the message can indicate a shared channel via which it is to be sent. In such examples, the intended recipient(s) can be determined based on users associated with the shared channel.

In various examples, the custom emoji can be included in the text of the message (e.g., inline before, after, or between words in the message and/or common emojis associated with the communication platform, etc.) and/or in an attachment to the message. A common emoji can include an emoji that is uniform across the organizations associated with the communication platform. The common emoji can be accessible to and/or useable by any of the computing devices associated with the organizations. For example, a message can include three emojis, the first two being common emojis used across all organizations of the communication platform and the third of which being a custom emoji associated with the first organization. For another example, the message can include a custom emoji sandwiched between two text strings.

At operation 218, the messaging component 118 can receive the message. The message can be received via the channel or via the direct messaging instance. The messaging component 118 can identify the one or more intended recipients of the message. In some examples, the intended recipients can be identified based on an identifier associated with the channel and/or one or more user identifiers associated with the direct messaging instance. In various examples, the messaging component 118 can determine that the one or more intended recipients are associated with a second organization that is different from the first organization (with which the first computing device 204 is associated). In at least one example, the messaging component 118 can determine that the intended recipient(s) are associated with the second organization based on the shared channel via which the message is received. For example, the messaging component 118 can receive the message via a shared channel between the first organization and the second organization. The messaging component 118 can determine, based on the particular shared channel, that one or more of the intended recipients are associated with a different organization from the message originator (e.g., different from the first organization).

At operation 220, the messaging component 118 formats the message to include the resource identifier. In various examples, the messaging component 118 can access a database to determine the resource identifier associated with the custom emoji. In some examples, the resource identifier can be included in the message in the place of the custom emoji. In such examples, the resource identifier can be provided at a location in the message (or an attachment thereto) at which the originator intended to display the custom emoji.

In various examples, the messaging component 118 formats the message to include the resource identifier based on a determination that the intended recipient(s) are associated with the second organization (e.g., different organization from the originator of the message). In some examples, the messaging component 118 formats the message to include the resource identifier based on a determination that the channel via which the message is sent is a shared channel, such as between the first organization and the second organization. In some examples, the messaging component 118 includes the resource identifier in instances of the message that are presented to users associated with the second organization (e.g., different from the first (originator's) organization).

At operation 222, the messaging component 118 sends a formatted message to the second computing device 216 associated with the second organization. The formatted message can provide a means by which the second computing device (e.g., recipient computing device) can access the custom emoji associated with a different organization for rendering.

At operation 224, a second instance of the application 142 associated with the second computing device 216 receives the formatted message. In some examples, the second computing device 216 receives the formatted message via the shared channel through which it is sent. In such examples, the first computing device 204 and the second computing device 216 are associated with the shared channel. In some examples, the second computing device receives the formatted message via a direct messaging instance between at least the first user and a second user associated with the second computing device.

At operation 226, the second instance of the application 142 identifies the custom emoji based on the resource identifier. In some examples, the second instance of the application 142 determines that the formatted message includes the custom emoji based on the resource identifier. In some examples, the second instance of the application 142 determines an organization identifier and/or an emoji name associated with the custom emoji based on the resource identifier. In some examples, the second instance of the application 142 determines that the custom emoji included in the formatted message is associated with the first organization.

In some examples, the second instance of the application 142 determines that the second organization has associated therewith a custom emoji with an emoji name that corresponds to the custom emoji included in the formatted message. In such examples, the second instance of the application 142 determines that the custom emoji included in (e.g., embedded in, attached to) the formatted message includes the custom emoji that was generated by a member of the first organization and not the second organization. In some examples, the second instance of the application determines that the emoji names of the respective custom emojis are the same. In some examples, the second instance of the application 142 determines that the emoji names are the same based on a determination that the respective emoji names include a threshold percentage (e.g., 95%, 97%, etc.) of same letters, numbers, symbols, or the like. In some examples, the second instance of the application 142 determines that the emoji names are the same based on a determination that the respective emoji names include the threshold percentage of same letters, numbers, symbols, etc. in a same or similar order (e.g., threshold order). The second instance of the application 142 causes the custom emoji associated with the first organization to be rendered on a display of the second computing device 216 via an associated user interface 146.

At operation 228, the second instance of the application 142 determines that the custom emoji included in the formatted message is not associated with the second organization. In some examples, the determination that the custom emoji is not associated with the second organization is based on a determination that the custom emoji is not stored locally in a datastore of the second computing device 216. In some examples, the determination that the custom emoji is not associated with the second organization is based on a determination that the custom emoji and/or the hash is not stored in a datastore associated with the second organization, such as on the server(s) 102.

At operation 230, the second instance of the application 142 retrieves the custom emoji from the first database based on the resource identifier. In some examples, the second instance of the application 142 retrieves the custom emoji from the first database based on a determination that the custom emoji is not associated with the second organization. For example, the second instance of the application 142 can search a datastore associated with the second computing device 216 and/or the second organization to determine that the custom emoji is not stored therein. Responsive to determining that the custom emoji is not stored in the datastore, the second instance of the application 142 can retrieve the custom emoji from the first database based on the resource identifier. The resource identifier can include the location and/or information about the first database to enable the second instance of the application 142 to access the custom emoji.

At operation 232, the second instance of the application 142 renders the message with the custom emoji for display on the second computing device. In various examples, the message with the custom emoji can be presented via the user interface 146 associated with the second instance of the application 142. In various examples, the second instance of the application 142 causes the custom emoji (e.g., image associated therewith) downloaded from the database (e.g., datastore 122, local database, etc.) to be presented in lieu of the resource identifier in the message. In some examples, the image associated with the custom emoji is presented at the location in the message (e.g., inline, in an attachment, etc.) at which the originator (e.g., user associated with the first computing device 204) included the custom emoji in the message.

At operation 234, the second instance of the application 142 stores the custom emoji on a second database associated with the second computing device 216. In some examples, the second instance of the application 142 stores the custom emoji and data associated therewith locally on the second computing device 216. In such examples, the custom emoji can be readily accessible by the second instance of the application 142 should a subsequent message including the custom emoji be received. In some examples, the second instance of the application 142 can be stored based on the resource identifier, the organization identifier associated therewith, the emoji name, the hash, and/or other data associated with the custom emoji.

Figure 3:
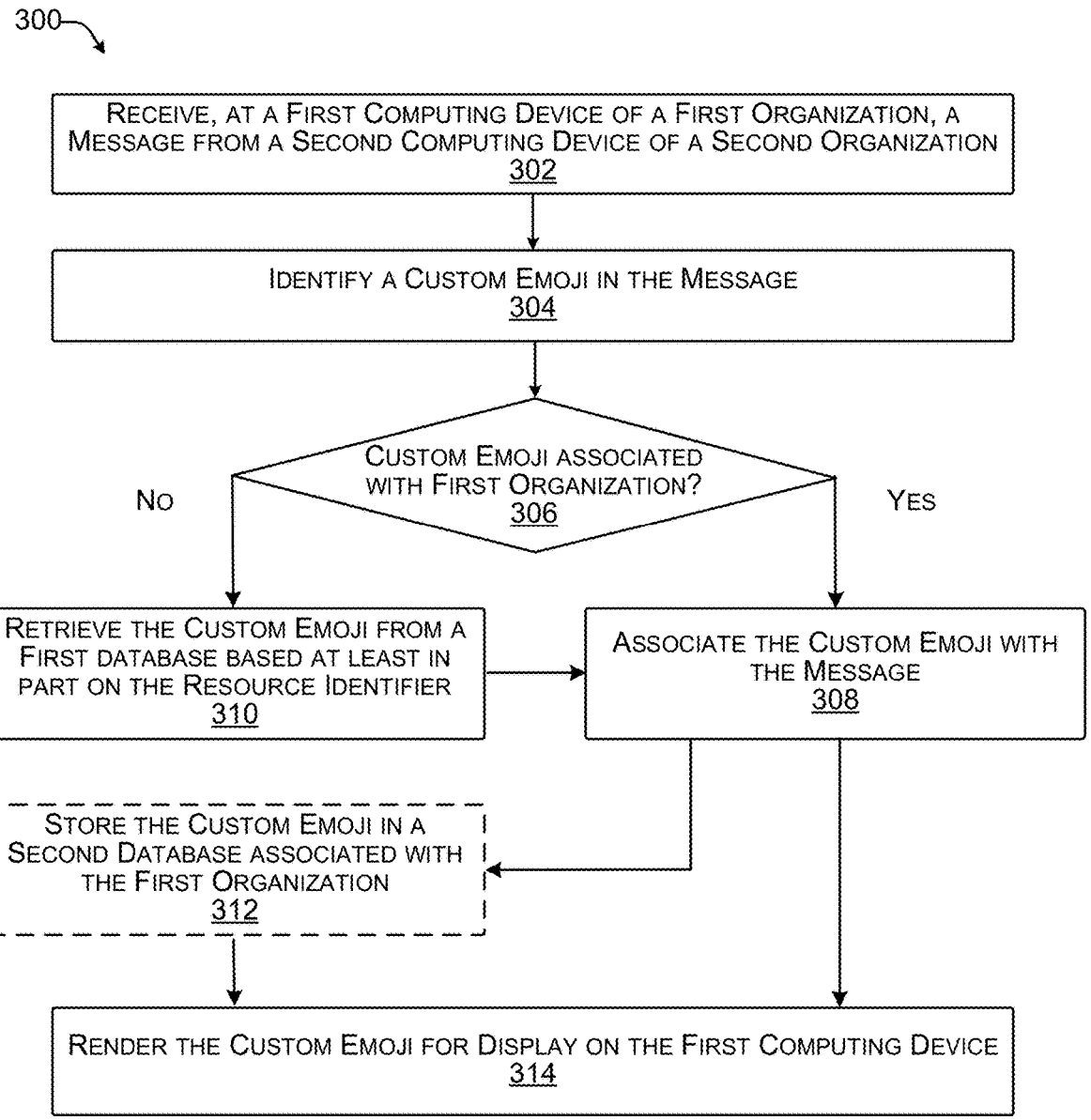
FIG. 3 illustrates an example process for rendering a custom emoji for display on a client device, as described herein.

FIG. 3 illustrates an example process 300 for rendering a custom emoji for display on a client device, as described herein.

At operation 302, a first instance of an application 142 receives, at a first computing device of a first organization, a message from a second computing device of a second organization. In various examples, the first organization can be a different organization from the second organization. In some examples, the first organization and the second organization can have associated therewith, organization identifiers (e.g., names, letters, symbols, numbers, etc.) that uniquely identify each of the organizations as independent entities. In some examples, the organization identifiers can be included as metadata in the message. In some examples, the organization identifiers can be associated with a shared channel between the first organization and the second organization. In some examples, the organization identifiers can be associated with a direct messaging instance between a first user associated with the first computing device and a second user associated with the second computing device.

In various examples, the message is generated via a second instance of the application 142 on the second computing device. In some examples, the application 142 includes a group-based messaging application managed by a communication platform. The group-based messaging application can be configured to facilitate communication between two or more users of the communication platform. In some examples, the group-based messaging application enables communications (e.g., messaging) between a first user associated with the first computing device and a second user associated with the second computing device via a shared communication channel. The shared communication channel can facilitate communication between two or more users associated with different organizations (e.g., the first organization and the second organization, etc.).

In some examples, the group-based messaging application can be configured to facilitate communication between two or more or more users via a direct messaging instance. The direct messaging instance can include a private message between the two or more users included in the direct messaging instance. In some examples, the message can include a direct message between the second user and the first user. In such examples, other users associated with the first organization and the second organization can be restricted from viewing the message.

At operation 304, the first instance of the application 142 identifies a custom emoji in the message. In some examples, the custom emoji can be identified based on a resource identifier included in the message. In some examples, a server computing device associated with the communication platform can format the message to replace the custom emoji with the resource identifier associated therewith. In such examples, the first instance of the application 142 identifies the custom emoji in the message based on the resource identifier located therein. In some examples, the resource identifier can include an emoji name, an organization identifier associated with the custom emoji, a hash associated with the custom emoji, and/or other data usable to uniquely identify the particular emoji associated therewith. In at least one examples, the resource identifier can include a URL indicating a location in a datastore, such as datastore 122, at which the associated custom emoji is stored.

In various examples, the first instance of the application 142 identifies the custom emoji based on a map appended to the message. In such examples, based on a determination that the map is appended to the message, the first instance of the application 142 can utilize the resource locator to access the custom emoji. In examples in which the custom emoji is included in an attachment to the message, the first instance of the application 142 can determine that the map is associated with the attachment. In such examples, the first instance of the application 142 can utilize the resource locator associated with the attachment to render the custom emoji.

Additionally or alternatively, the first instance of the application 142 can identify a common emoji in the message. The common emoji can include an emoji that is uniform across the organizations associated with the communication platform. The common emoji can be accessible to and/or useable by any of the computing devices associated with the organizations. The communication platform can provide the emojis to users associated with the communication platform, for incorporating into messages, attachments, reactions, and the like. In some examples, the common emojis can be identified based on a string (e.g., combination of letter, symbols, numbers, etc.) and/or emoji name associated therewith. In such examples, the receiving computing device can identify the common emoji based on the string and/or the emoji name and can access the common emoji from a database associated with the computing device. For example, the first instance of the application 142 can receive the message and identify a string and/or an emoji name within the message that is associated with a common emoji of the communication platform. The first instance of the application 142 can then cause the common emoji to be rendered on a display of the first computing device.

At operation 306, the first instance of the application 142 determines whether the custom emoji is associated with the first organization. In some examples, the custom emoji can be associated with the first organization based on a determination that the custom emoji and/or resource identifier is stored in a database associated with the first organization. In some examples, the database associated with the first organization can include a database locally stored on the first computing device. That is, the first instance of the application 142 can determine whether the custom emoji and/or resource identifier is stored locally on the first computing device.

In at least one example, the first instance of the application 142 can be configured to reconcile two different custom emojis having a same name. For example, the first instance of the application 142 can receive a first custom emoji associated with a second organization and determine a first emoji name associated with the first custom emoji. The first instance of the application 142 can determine that the first emoji name matches, or otherwise corresponds to, a second custom emoji associated with the first organization. The first instance of the application 142 can determine that the emoji names match, or otherwise correspond, based on a determined difference between the first emoji name and the second emoji name being less than a threshold difference (e.g., less than one letter difference, less than one symbol difference, having a similarity score below a threshold, etc.). In some examples, based on a determination that the emoji names match or otherwise correspond, the first instance of the application 142 can use the organization identifier associated with the first custom emoji to determine that the first custom emoji is associated with the second organization. In such an example, the first instance of the application 142 determines to render the first custom emoji associated with the second organization in lieu of the similarly named second custom emoji associated with the first organization.

Based on a determination that the custom emoji is associated with the first organization ("Yes" at operation 306), the first instance of the application 142, at operation 308, associates the custom emoji with the message. In some examples, the first instance of the application 142 associates the custom emoji with the message by retrieving the custom emoji from a database associated with the first organization, such as a local datastore of the first computing device, and including the custom emoji in the message. In some examples, the first instance of the application 142 includes the custom emoji (e.g., image associated therewith) in the message in lieu of the resource identifier. In such examples, the first instance of the application 142 replaces the resource identifier with the image associated with the custom emoji. In some examples, the first instance of the application 142 includes the custom emoji at the location (e.g. inline, in an attachment, etc.) at which the message originator (e.g., second user associated with the second computing device) included the custom emoji prior to sending the message to the first user.

Based on a determination that the custom emoji is not associated with the first organization ("No" at operation 306), the first instance of the application 142, at operation 310, retrieves the custom emoji from a first database based at least in part on the resource identifier. In some examples, the resource identifier can include a location at which the custom emoji is stored on a remote database, such as datastore 122 managed by the communication platform. In such examples, the first instance of the application 142 can access the location in the database to retrieve the custom emoji. In some examples, the first instance of the application 142 can download the custom emoji from the remote database. In some examples, the first instance of the application 142 can download the data associated with the custom emoji and/or metadata associated therewith. In such examples, the first instance of the application 142 can store the data associated with the custom emoji on a local datastore of the associated computing device.

In various examples, responsive to storing the data associated with the custom emoji on the local datastore, the first instance of the application 142 can provide the custom emoji to a user of the first organization for inclusion in an additional message. For example, a first instance of an application 142 may retrieve a dancing_penguin custom emoji from a remote datastore and may store the dancing_penguin in a local datastore. The first instance of the application 142 may render the dancing_penguin in an emoji menu such that the user can include the custom emoji in a subsequent message with a user of the second organization and/or another organization. In some examples, the first instance of the application 142 can cause the custom emoji to be available to one or more users of the first organization, such as by causing the data associated with the custom emoji to be stored in a datastore associated with the first organization and accessible to one or more computing devices associated therewith. In such examples, the custom emoji may be available for use by the one or more users of the first organization. In some examples, the first instance of the application 142 may associate limited permission settings with the stored custom emoji. In such examples, the limited permission settings may enable viewing of the custom emoji but may disable use of the custom emoji in subsequent messages. Using the dancing_penguin custom emoji example from above, the first instance of the application 142 may store the dancing_penguin in the local datastore and may cause the dancing_penguin custom emoji to be rendered in association with a message from the second organization. However, the first instance of the application 142 may disable use of the dancing_penguin custom emoji in a message generated by the user of the first organization.

In some examples, the first instance of the application 142 can send a request to the server computing device associated with the communication platform to access the custom emoji. In some examples, the request can include the resource identifier. In response to the request, the server computing device can send the custom emoji and/or data associated therewith to the first computing device. In various examples, in response to retrieving the custom emoji from a first database, the first instance of the application 142 can associate the custom emoji with the message, as described above with regard to operation 308.

At operation 312, the first instance of the application 142 (optionally) stores the custom emoji in a second database associated with the first organization. In some examples, the second database is a database located on the first computing device. In some examples, the second database is a remote database accessible to one or more user devices associated with the first organization.

In some examples, the custom emoji can be stored based on the resource identifier. In some examples, the custom emoji can be stored based on one or more of the organization identifier, emoji name, and/or hash associated therewith. In some examples, the custom emoji can be stored in the second database based on the association with a different organization from the first organization. In such examples, the first instance of the application 142 can store custom emojis associated with different organizations separate from custom emojis associated with the first organization.

At operation 314, the first instance of the application 142 renders the message including the custom emoji on a display of the first computing device. As discussed above, the custom emoji can be presented at the location in the message (e.g., inline, in an attachment, etc.) at which the originator (e.g., the second user associated with the second computing device) included the custom emoji in the message.

Figure 4:
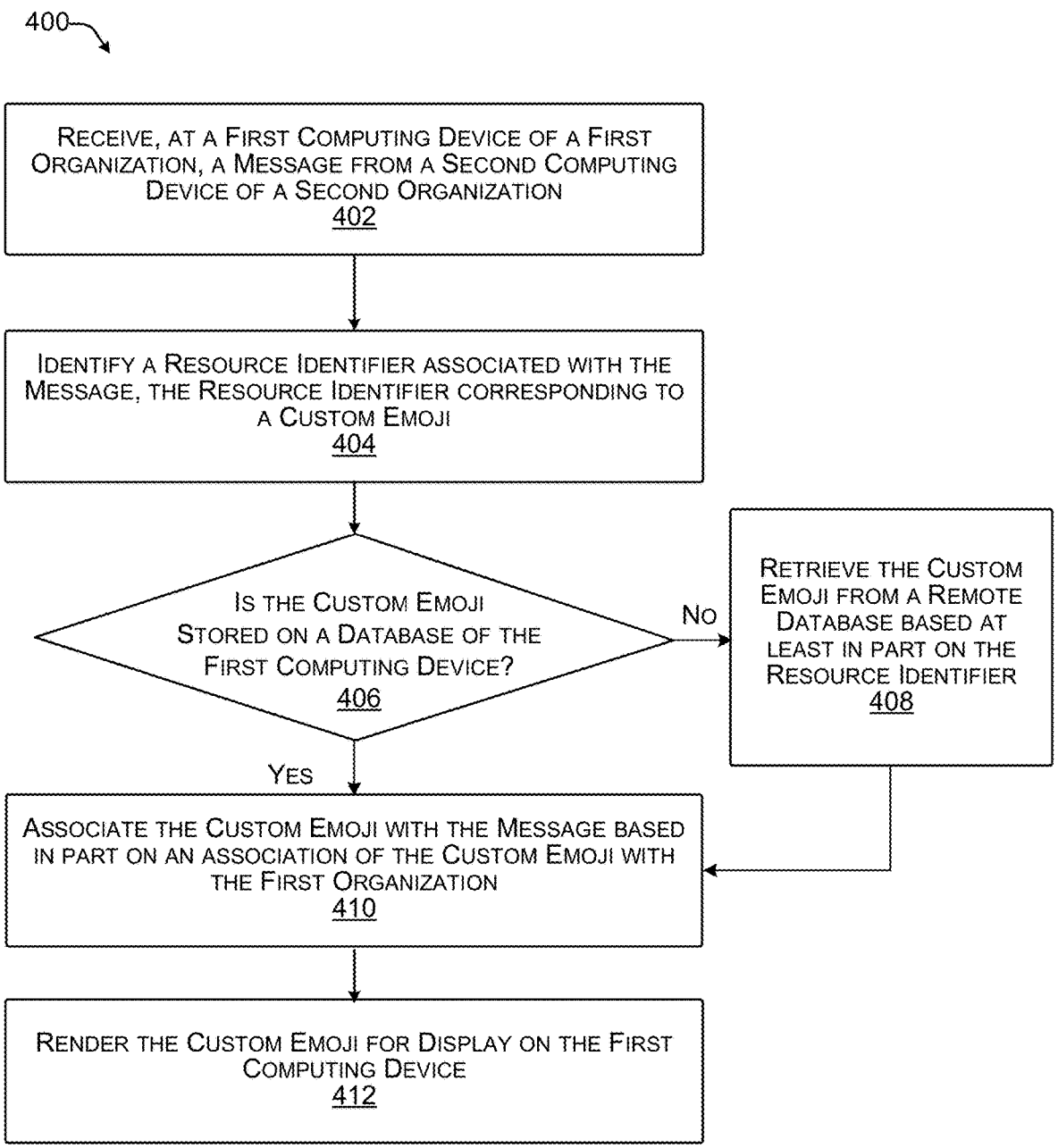
FIG. 4 illustrates another example process for rendering a custom emoji for display on a client device, as described herein.

FIG. 4 illustrates another example process 400 for rendering a custom emoji for display on a client device, as described herein.

At operation 402, the first instance of the application 142 receives, at a first computing device of a first organization, a message from a second computing device of a second organization. The message can include a string of text, emojis, symbols, and the like. In some examples, the message can include an attachment, such as a document or photograph associated with the message.

In various examples, the first organization can be a different organization from the second organization. In some examples, the first organization and the second organization can have associated therewith, organization identifiers (e.g., names, letters, symbols, numbers, etc.) that uniquely identify each of the organizations as independent entities. In some examples, the organization identifiers can be included as metadata in the message. In some examples, the organization identifiers can be associated with a shared channel between the first organization and the second organization. In some examples, the organization identifiers can be associated with a direct messaging instance between a first user associated with the first computing device and a second user associated with the second computing device.

In various examples, the message is generated via a second instance of the application 142 on the second computing device. In some examples, the application 142 includes a group-based messaging application managed by a communication platform. The group-based messaging application can be configured to facilitate communication between two or more users of the communication platform. In some examples, the group-based messaging application enables communications (e.g., messaging) between a first user associated with the first computing device and a second user associated with the second computing device via a shared communication channel. The shared communication channel can facilitate communication between two or more users associated with different organizations (e.g., the first organization and the second organization, etc.).

In some examples, the group-based messaging application can be configured to facilitate communication between two or more or more users via a direct messaging instance. The direct messaging instance can include a private message between the two or more users included in the direct messaging instance. In some examples, the message can include a direct message between the second user and the first user. In such examples, other users associated with the first organization and the second organization can be restricted from viewing the message.

At operation 404, the first instance of the application 142 identifies a resource identifier associated with the message, the resource identifier corresponding to a custom emoji. In at least one example, the resource identifier can include a URL indicating a location in a datastore, such as datastore 122, at which the associated custom emoji is stored. In some examples, the first instance of the application 142 identifies the resource identifier based on a determination that a map, such as a custom emojis map, is appended to the message. In such examples, the first instance of the application 142 identifies the resource identifier based on the determination that the map is appended to the message.

In some examples, the resource identifier can include an emoji name associated with the custom emoji. In some examples, the emoji name can be determined by the user associated with the custom emoji generation. In such examples, the user requesting that the custom emoji be generated can determine the emoji name at a time of request submission. In some examples, the resource identifier can include an organization identifier associated with the organization corresponding to the user that generated the custom emoji. In various examples, the request to generate the custom emoji can have included therein or associated therewith the organization identifier. In some examples, the generated custom emoji can be stored in a database based on the organization identifier. In various examples, the resource identifier can include a hash generated by the communication platform. The hash can be generated concurrently or consecutively with the custom emoji. As described above, the hash can include a timestamp associated with custom emoji generation (e.g., associated with the request), an image associated with the emoji, a textual description of the image, an emoji name, an organization identifier, a user identifier associated with the generating user, and/or other data associated with the custom emoji. In some examples, the hash can include a non-guessable string of data that is unique to the custom emoji. In such examples, the custom emoji can be identified by the hash.

In some examples, the server computing device (e.g., server(s) 102) associated with the communication platform can format the message to replace the custom emoji with the resource identifier associated therewith. In such examples, the first instance of the application 142 identifies the custom emoji in the message based on the resource identifier located therein. In some examples, the server computing device can append the custom emojis map to the message and/or an attachment thereto. In various examples, the first instance of the application 142 identifies the custom emoji based on the map appended to the message and/or the attachment. In such examples, based on a determination that the map is appended to the message, the first instance of the application 142 can utilize the resource locator to access the custom emoji. In examples in which the custom emoji is included in an attachment to the message, the first instance of the application 142 can determine that the map is associated with the attachment. In such examples, the first instance of the application 142 can utilize the resource identifier associated with the attachment to render the custom emoji.

Additionally or alternatively, the first instance of the application 142 can identify a common emoji in the message. The common emoji can include an emoji that is uniform across the organizations associated with the communication platform. The communication platform can provide the emojis to users associated with the communication platform, for incorporating into messages, attachments, reactions, and the like. In some examples, the common emojis can be identified based on a string (e.g., combination of letter, symbols, numbers, etc.) and/or an emoji name associated therewith. In such examples, the receiving computing device can identify the common emoji based on the string and/or the emoji name and can access the common emoji from a database associated with the computing device. For example, the first instance of the application 142 can receive the message and identify a string and/or emoji name within message that is associated with a common emoji of the communication platform. The first instance of the application 142 can then cause the common emoji to be rendered on a display of the first computing device.

In some examples, the first organization may include an organization setting that does not permit a rendering of custom emojis. In such examples, the first instance of the application 142 may determine that the message includes the custom emoji, but may refrain from rendering the custom emoji (e.g., may not proceed with the remaining operations of the process 400). In various examples, one or more users associated with the second organization that view the message may see the custom emoji, while one or more users associated with the first organization may not see the custom emoji. In some examples, based on a determination that the organization does not permit the rendering of custom emojis, the first instance of the application 142 may render text in lieu of the custom emoji, such as a name associated therewith or the like. In some examples, based on a determination that the organization does not permit the rendering of custom emojis, the first instance of the application 142 may not render any data in lieu of the custom emoji. In some examples, the first instance of the application 142 may render a space or a void in lieu of the custom emoji.

At operation 406, the first instance of the application 142 determines whether the custom emoji is stored on a database of the first computing device. In some examples, the first instance of the application 142 determines that the custom emoji is associated with the first organization based on a determination that the custom emoji is stored in the database of the first computing device. In some examples, the first instance of the application 142 can determine that the custom emoji is stored in the database based on the resource identifier, the emoji name, the organization identifier, the hash, or other data associated with the custom emoji. In such examples, the first instance of the application 142 can identify the custom emoji in the database based at least in part on the resource identifier and/or other data associated with the custom emoji. For example, the first instance of the application 142 can identify the custom emoji based on an organization identifier and an emoji name associated with the custom emoji. For another example, the first instance of the application 142 can identify the custom emoji in the database based on the hash associated therewith.

Based on a determination that the custom emoji is not stored on the database of the first computing device ("No" at operation 406), the first instance of the application 142, at operation 408, retrieves the custom emoji from a remote database based at least in part on the resource identifier. The remote database may include a database associated with the communication platform, a database associated with the second organization, or a database associated with any other organization associated with the communication platform, or another database located remotely from the first computing device.

Based on a determination that the custom emoji is stored on the database of the first computing device ("Yes" at operation 406) or after the custom emoji is retrieved from the remote database at operation 408, the first instance of the application 142, at operation 410, can associate the custom emoji with the message. In some examples, the custom emoji is associated with the message based in part on an association of the custom emoji with the first organization. In various examples, the first instance of the application 142 associates the custom emoji with the message by replacing the resource identifier representative of the custom emoji with the custom emoji itself (e.g., image). In some examples, the first instance of the application 142 can render a copy of the custom emoji within the message and/or in the attachment thereto based on the resource identifier.

At operation 412, the first instance of the application 142 renders the message including the custom emoji for display on the first computing device. As discussed above, the custom emoji can be presented at the location in the message (e.g., inline, in an attachment, etc.) at which the originator (e.g., the second user associated with the second computing device) included the custom emoji in the message.

Figure 5:
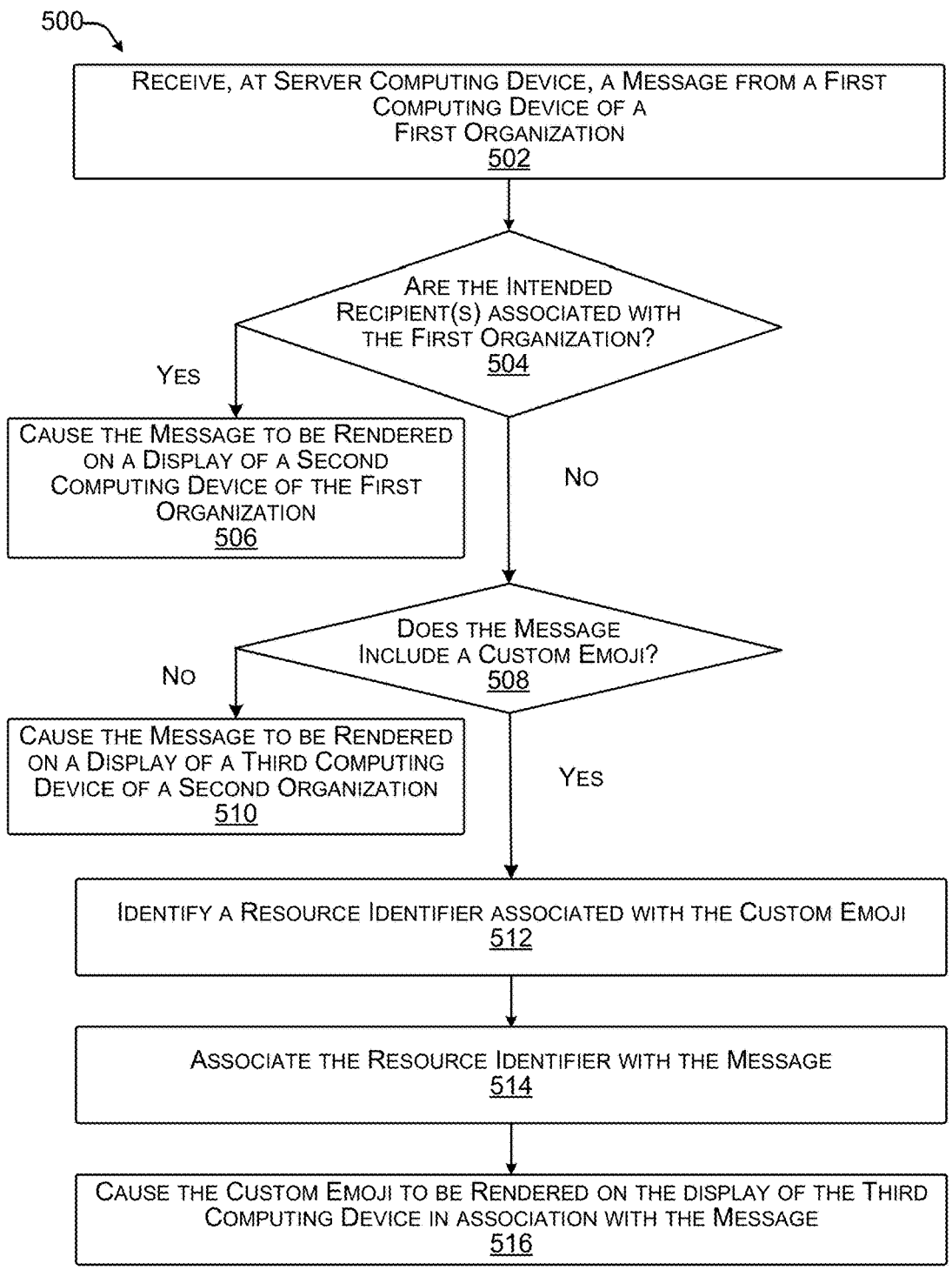
FIG. 5 illustrates an example process for causing a custom emoji to be rendered on a client device, as described herein.

FIG. 5 illustrates an example process 500 for causing a custom emoji to be rendered on a client device, as described herein.

At operation 502, the server(s) 102 receives a message from a first computing device of a first organization. In various examples, the server(s) 102 receives the message via a communication channel. In such examples, the communication channel can include a means by which two or more users can send and receive messages. The messages transmitted via the communication channel can be viewable by any users that are associated with the communication channel. In some examples, a user can request to join the communication channel. Based on an acceptance of the join channel request, a communication channel identifier can be associated with the user. Additionally, in some examples, a user identifier can be associated with the communication channel, such as a subscriber to the communication channel.

In various examples, the server(s) 102 receives the message via a direct messaging instance. In some examples, the direct messaging instance can include a means by which two or more users can send and receive private messages. The private messages sent via the direct messaging instance can be viewable by the users associated with the direct messaging instance. In various examples, a direct messaging instance identifier can be associated with a user identifier corresponding thereto and/or vice versa.

At operation 504, the server(s) 102 determines whether the intended recipients of the message are associated with the first organization. In examples in which the message is sent via the communication channel, the intended recipient(s) includes the users that are associated with the communication channel (e.g., subscribers to the communication channel). In various examples, the server(s) 102 can determine that the intended recipient(s) are associated with the first organization based on a type of communication channel via which the message is sent. The communication channel can include a single organization channel or a multi-organization channel. In examples in which the communication channel is a single organization channel, the server(s) 102 determines that the intended recipient(s) are associated with the first organization. In examples in which the communication channel is a multi-organization channel (e.g., shared communication channel), the server(s) 102 determines that at least one intended recipient is associated with a second organization.

In examples in which the message is sent via a direct messaging instance, the intended recipient includes the one or more users associated with the direct messaging instance. In various examples, the server(s) 102 determines whether the intended recipient(s) are associated with the first organization based on an organization identifier and/or a user identifier associated with each intended recipient.

In various examples, the server(s) 102 may convert a direct messaging instance into a communication channel. In some examples, one or more custom emojis included in the direct messaging instance may be viewable and/or usable via the communication channel. As described above, an organization may have associated therewith a permission setting that prevents the viewing and/or use of custom emojis generated by another organization. In some examples, the converted communication channel may render the custom emoji or a replacement therefor (e.g., text, a void, nothing, etc.) based on the permission settings. As such, a same custom emoji or replacement therefor may be rendered in the converted communication channel and the direct messaging instance from which the communication channel was converted.

Based on a determination that the intended recipient(s) are associated with the first organization ("Yes" at operation 504), the server(s) 102, at operation 506, causes the message to be rendered on a display of a second computing device of the first organization. In some examples, the server(s) 102 sends the message to the second computing device with an instruction to render the message. In some examples, the server(s) 102 can determine that the message includes one or more common emojis associated with the communication platform and/or one or more custom emojis associated with the communication platform. In some examples, the server(s) 102 can identify the common emoji(s) and/or the custom emoji(s) based on a string and/or an emoji name associated therewith that is embedded in the message and/or in an attachment thereto. In various examples, server(s) 102 can send the string and/or the emoji name to the second computing device, such as via an instance of an application 142, to cause the common emoji(s) and/or the custom emoji(s) to be rendered with the message on the display of the second computing device associated with the first organization.

In various examples, the server(s) 102 can cause the common emoji(s) and/or the custom emoji(s) to be rendered on the display of the second computing device that is associated with the first organization based on the following formatted message:

```
{ok: true, channel: "C153GPT3L", ts; "1593130844.002000:,_}
    channel: "C153GPT3L"
    message: {client_msg_id: "29cc2678-4332-4878-9cfa-d3ebf71ce76", type: "message", ...}
        blocks: [{type:"rich_text", block_id: "7SnI", elements: [{type: "rich_text_section", ...}]}]
        0: {type:"rich_text", block_id: "7SnI", elements: [{type: "rich_text_section", ...}]}
            block_id: "7SnI"
            elements: [{type: "rich_text_section", ...}]
                0: {type: "rich_text_section", ...}
                    elements: [{type: "text", text: "Let's see the "}, {type "text", text: "guts", style:
{bold: true}}, ...]
                        0: {type: "text", text: "Let's see the "}
                        1: {type: "text", text: "guts", style: {bold: true}}
                        2: {type: "text", text: "of this message. "}
                        3: {type: "emoji", name: "mag"}
                            name: "mag"
                            type: "emoji"
                    type: "rich text section"
            type: "rich text"
        client_msg_id: "29cc2678-4332-4878-9cfa-d3ebf71ce76"
        team: "T0M5KR42E"
        text: "Let's see the *guts* of this message. :mag:"
        ts: "1593130844.002000"
        type: "message"
    ok: true
    ts: "1593130844.002000",
``` wherein the "mag" is a name associated with the custom emoji. In an example in which custom emojis associated with another organization are not renderable by instances of an application associated with an organization, a recipient of the message may receive a message that states "Let's see the guts of this message. :mag:" or another replacement (e.g., a void, a space, the words "custom emoji," etc.) for the custom emoji. In such an example, the context and meaning associated with the custom emoji may be lost, thereby potentially leading to miscommunication. In an example in which custom emojis associated with the other organization are renderable, the recipient of the message may view "Let's see the guts of this message. <emoji of mag>." In such an example, the context and meaning associated with the message may be transmitted to the recipient, thereby improving communication between the sender and recipient of the message.

Based on a determination that the intended recipient(s) are not associated with the first organization ("No" at operation 504), the server(s) 102, at operation 508, determines whether the message includes a custom emoji. In various examples, the server(s) 102 scans the message text and/or attachments thereto, to identify the custom emoji. The custom emoji can be included inline in the message and/or in an attachment thereto. In some examples, the server(s) 102 determines that the message includes the custom emoji based on an emoji name and/or organization identifier associated with the message. In such examples, the server computing device determines that the emoji name and/or the emoji name corresponding to the organization identifier is associated with a custom emoji. In some examples, the server(s) 102 determines that the message includes the custom emoji based on a unique code associated therewith. In such examples, the server(s) 102 determines that the unique code is associated with a custom emoji of the first organization.

Based on a determination that the message does not include a custom emoji ("No" at operation 508), the server(s) 102, at operation 510, causes the message to be rendered on a display of a third computing device of a second organization. In some examples, the server(s) 102 sends the message to the third computing device with an instruction to render the message on the display, such as via a user interface 146. In some examples, the server(s) 102 can determine that the message includes one or more common emojis associated with the communication platform. In some examples, the message can include a string, emoji name, or other identifier associated with the common emoji. In such examples, based on the string, the emoji name, or other identifier, and/or the instruction to render the message, the third computing device can identify and render the common emoji.

Based on a determination that the message does include a custom emoji ("Yes" at operation 508), the server(s) 102, at operation 512, identifies a resource identifier associated with the custom emoji. In some examples, the resource identifier is identified based on a string and/or an emoji name associated with the custom emoji. In some examples, the resource identifier is identified based on an emoji name and/or an organization identifier associated with the first organization. In various examples, the resource identifier includes a location in a database associated with the server(s) 102 at which the custom emoji is stored. In some examples, the server computing device generates the resource identifier based on an emoji name, an organization identifier associated with the first organization, and a hash associated with the custom emoji. As discussed above, the hash can include the non-guessable code generated by the server computing device at a time associated with custom emoji generation. In at least one examples, the resource identifier includes a uniform resource locator indicating a location in a database at which the custom emoji is stored.

At operation 514, the server(s) 102 associates the resource identifier with the message. In some examples, the server(s) 102 formats the message to include the resource identifier. In such examples, the server(s) 102 provides a mapping for the second computing device to resolve the custom emoji, such as by downloading the image associated with the custom emoji from the location associated with the resource identifier.

At operation 516, the server(s) 102 causes the custom emoji to be rendered on the display of the third computing device of the second organization in association with the message based at least in part on the resource identifier. In various examples, the server(s) 102 sends the message with the resource identifier to the third computing device, such as to an instance of the application 142. In some examples, the server(s) 102 sends an instruction to render the message via the user interface 146 associated with the application 142.

In various examples, the server(s) 102 can cause the custom emoji to be rendered on the display of the third computing device that is associated with the second organization based on the following formatted message:

```
{ok: true, channel: "S153GPT3L", ts; "1593130844.002000:,_}
  channel: "S153 GPT3L"
    message: {client_msg_id: "29cc2678-4332-4878-9cfa-d3ebf71ce76", type: "message", ...}
      blocks: [{type:"rich_text", block_id: "7SnI", elements: [{type: "rich_text_section", ...}]}]
        0: {type:"rich_text", block_id: "7SnI", elements: [{type: "rich_text_section", ...}]}
          block_id: "7SnI"
          elements: [{type: "rich_ text_section", ...}]
            0: {type: "rich_text_section", ...}
              elements: [{type: "text", text: "Let's see the "}, {type "text", text: "guts", style:
{bold: true}}, ...]
                0: {type: "text", text: "Let's see the "}
                1: {type: "text", text: "guts", style: {bold: true}}
                2: {type: "text", text: "of this message. "}
                3: {type: "custom emoji", name: "bigeyes"}
                  name: "bigeyes"
                  display_URL: "custom emoji"
                  display_team_id: "T0M5KR42Ebigeyes070720201800:bigeyes:.html"
              type: "rich_text_section"
          type: "rich_text"
      client msg id: "29cc2678-4332-4878-9cfa-d3ebf71ce76"
      team: "T0M5KR42E"
      text: "Let's see the *guts* of this message. :bigeyes:"
      ts: "1593130844.002000"
      type: "message"
    ok: true
  ts: "1593130844.002000
```

Responsive to receiving the message, the instance of the application 142 on the third computing device can resolve the resource identifier (e.g., illustrated as the following "T0M5KR42Ebigeyes070720201800bigeyes.html") and render the custom emoji, such as 👀, on the display. In some examples, the third computing device can resolve the resource identifier based on the organization identifier (e.g., team identifier illustrated as "T0M5KR42E"). In some examples, the instance of the application 142 can determine that the custom emoji is stored in a local datastore of the third computing device. In such examples, the instance of the application can render the custom emoji without accessing a remote datastore. In some examples, the instance of the application 142 can determine that the custom emoji is not stored in the local datastore and can access the custom emoji based on the resource identifier. In at least one example, the instance of the application 142 can access a uniform resource locator associated with the resource identifier to retrieve (e.g., download) a copy of the custom emoji. In such an example, the instance of the application 142 can render the copy of the retrieved custom emoji in association with the message.

In various examples, the server(s) 102 stores an instance of the message in a database associated with at least one of the first user, the second user, the first organization, the second organization. In examples in which the message is transmitted via a shared communication channel, the server(s) 102 stores the instance of the message in association with the shared communication channel. In examples in which the message is transmitted via a direct messaging instance, the server(s) 102 stores the instance of the message in association with direct messaging instance. In various examples, the instance of the message of the message can include the resource identifier. In some examples, the instance of the message can include the emoji name and/or organization identifier associated therewith. For example, the server(s) 102 stores an instance of the message including bigeyes custom emoji described above as ["Let's see the *guts* of this message. :bigeyes:"]. It is understood by those skilled in the art that other message formats can be stored to reduce an amount of data needed to store the messages.

Techniques described above with reference to FIGS. 1-5 are directed to, among other things, enabling a client device associated with an organization to render a custom emoji that is associated with a different organization. That is, in at least one example, the client device of the organization can receive a message including a custom emoji associated with another organization, identify the custom emoji included in the message, access the custom emoji, and render the custom emoji on a display of the client device. The message can be a message sent via the communication platform, such as a direct message or a message associated with an externally shared communication channel (e.g., shared communication channel). The message can include a string of text, emojis, symbols, and the like. In some examples, the message can include an attachment, such as a document or photograph associated with the message.

From the user experience perspective, techniques described herein greatly enhance effective communication between users of different organizations. The enhanced communication between users of the different organizations results in better collaboration between different organizations while eliminating confusion in pictorial conversations, such as if two different organizations have associated therewith a same emoji name for different emojis. In addition, techniques described herein can reduce a total amount of data transmitted across a network to effectively communicate a point. In some examples, users can utilize particular emojis to represent actions, such as affirmations, delight, rejections, and the like. The particular emojis can be used in lieu of written expressions capturing a same or similar meaning. Because the written expressions can be replaced with a more effective pictorial tool including less data than many written expressions, the techniques described herein can reduce a total amount of data transmitted between users to communicate a point. Further, because the techniques described herein can result in increased brevity in communications with decreasing levels of confusion, the techniques described herein can result in fewer total messages being sent over the network. As such, the techniques described herein can decrease the total amount of network traffic needed to communicate between users.

As such, techniques described herein provide specific, technical solutions to technical problems faced by existing systems, the details of which are described above.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method implemented at least in part by a first client associated with a group-based communication platform, the method comprising:
    receiving, at the first client associated with a first organization, a first message from a second client associated with a second organization, wherein the first message is associated with a shared communication channel between the first organization and the second organization, and the first organization is different from the second organization;
    identifying, in the first message, a custom emoji associated with a resource identifier, wherein the resource identifier is associated with the second organization and not the first organization;
    in response to a determination that the resource identifier is not associated with the first organization, retrieving the custom emoji from a first database of the group-based communication platform based at least in part on the resource identifier, wherein the first database is associated with the second organization and not the first organization and the first database comprises data associated with the second organization and not other data associated with the first organization;
    rendering the first message with the custom emoji for display via the first client; and
    storing emoji data associated with the custom emoji in a second database associated with the first organization, wherein the emoji data comprises permissions associated with the custom emoji that limit availability of the custom emoji to rendering in association with subsequent messages associated with the second organization.

2. The method of claim 1, wherein the resource identifier is a uniform resource locator.

3. The method of claim 1, wherein the custom emoji is associated with at least one of an organization identifier or a hash value, determined based at least in part on the resource identifier, and wherein retrieving the custom emoji comprises:
    identifying the first database based at least in part on at least one of the organization identifier or the hash value; and
    downloading the custom emoji from the first database.

4. The method of claim 1, wherein the custom emoji is a first custom emoji and the resource identifier is a first resource identifier, the method further comprising:
    receiving, from the group-based communication platform, a second message associated with the shared communication channel between the first organization and the second organization;
    identifying, in the second message, a second custom emoji associated with a second resource identifier, wherein the second resource identifier is associated with the second organization;
    in response to a determination that the second resource identifier is associated with the first organization, associating the second custom emoji with the second message; and
    rendering the second message with the second custom emoji for display via the first client.

5. The method of claim 1, wherein the resource identifier comprises at least one of:
    an organization identifier associated with the second organization;
    an emoji name associated with the custom emoji; or
    a hash value associated with the custom emoji.

6. The method of claim 1, wherein the first database comprises custom emojis associated with at least one organization.

7. The method of claim 1, wherein the second database is different from the first database.

8. A first device comprising:
    a first database;
    one or more processors; and
    one or more computer readable media storing instructions that, when executed, cause the first device to perform operations comprising:
        receiving, from a second device via a group-based communication platform, a first message associated with a shared communication channel between a first organization associated with the first device and a second organization associated with the second device, wherein the second organization is different from the first organization;
        identifying, in the first message, a first custom emoji that is associated with a resource identifier, wherein the resource identifier is associated with the second organization and not the first organization;
        retrieving the first custom emoji from a second database associated with the group-based communication platform based at least in part on the resource identifier, wherein the second database is associated with the second organization and not the first organization and the second database comprises data associated with the second organization and not other data associated with the first organization;

rendering the first message with the first custom emoji for display via the first device; and
storing emoji data associated with the first custom emoji in the first database, wherein the emoji data comprises permissions associated with the first custom emoji that limit availability of the first custom emoji to rendering in association with subsequent messages associated with the second organization.

9. The first device of claim 8, the operations further comprising:
receiving, from the second device via the group-based communication platform, a second message associated with the shared communication channel;
identifying, in the second message, a common emoji that is associated with the group-based communication platform; and
rendering the second message with the common emoji for display on the first device.

10. The first device of claim 8, wherein storing the emoji data comprises storing data associated with the first custom emoji in association with the resource identifier in the first database.

11. The first device of claim 8, the operations further comprising retrieving the first custom emoji from the second database based on a determination that the first custom emoji is not stored in the first database.

12. The first device of claim 8, the operations further comprising:
identifying a first emoji name and an organization identifier associated with the first custom emoji based at least in part on the resource identifier;
determining that the first emoji name associated with the first custom emoji corresponds to a second emoji name associated with a second custom emoji associated with the first organization; and
based on a determination that the organization identifier is associated with the second organization, rendering the first custom emoji for display.

13. The first device of claim 8, wherein the resource identifier is a first resource identifier, the operations further comprising:
receiving, from the group-based communication platform, a second message associated with the shared communication channel;
identifying, in the second message, a second custom emoji associated with a second resource identifier, wherein the second resource identifier is associated with the second organization;
retrieving the second custom emoji from the first database associated with the first device based at least in part on the second resource identifier; and
rendering the second message with the second custom emoji for display via the first device.

14. The first device of claim 8, the first custom emoji is associated with at least one of an organization identifier or a hash value, determined based at least in part on the resource identifier, and wherein retrieving the first custom emoji comprises:
identifying the second database based at least in part on at least one of the organization identifier or the hash value; and
downloading the first custom emoji from the second database.

15. The first device of claim 8, wherein the resource identifier comprises a uniform resource locator.

16. One or more non-transitory computer readable media storing computer-executable instructions that, when executed by one or more processors of a first client associated with a first organization associated with a group-based communication platform, cause the first client to perform operations comprising:
receiving, from a group-based communication platform, a first message originating from a second client associated with a second organization associated with the group-based communication platform, wherein the second organization is different from the first organization;
identifying, in the first message, a custom content item that is associated with a resource identifier, wherein the resource identifier is associated with the second organization and not the first organization;
in response to a determination that the resource identifier is not associated with the first organization, retrieving the custom content item from a first database associated with the group-based communication platform based at least in part on the resource identifier, wherein the first database is associated with the second organization and not the first organization and the first database comprises data associated with the second organization and not other data associated with the first organization;
rendering the first message with the custom content item for display via the first client; and
storing custom content item data associated with the custom content item in a second database associated with the first organization, wherein the custom content item data comprises permissions associated with the custom content item that limit availability of the custom content item to rendering in association with subsequent messages associated with the second organization.

17. The one or more non-transitory computer-readable media of claim 16, wherein the resource identifier comprises at least one of:
an organization identifier associated with the second organization;
an emoji name associated with the custom content item; or
a hash value associated with the custom content item.

18. The one or more non-transitory computer-readable media of claim 16, wherein the first database comprises custom content items associated with at least one organization.

19. The one or more non-transitory computer-readable media of claim 16, wherein the custom content item is a first custom content item and the resource identifier is a first resource identifier, the operations further comprising:
receiving, from the group-based communication platform, a second message;
identifying, in the second message, a second custom content item associated with a second resource identifier, wherein the second resource identifier is associated with the second organization;
in response to determining that the second resource identifier is associated with the first organization, associating the second custom content item with the second message; and
rendering the second message with the second custom content item for display via the first client.

20. The one or more non-transitory computer-readable media of claim 16, wherein the first message is received via at least one of:
a shared communication channel between the first organization and the second organization; or a direct messaging instance between at least a first user associated with the first client and a second user associated with the second client.

\* \* \* \* \*